US012696123B2

(12) United States Patent　　　　(10) Patent No.: US 12,696,123 B2
Niu et al.　　　　　　　　　　　　　(45) Date of Patent: Jul. 28, 2026

(54) RELAXATION CRITERION FOR UE POWER SAVING

(71) Applicant: Apple Inc., Cupertino, CA (US)

(72) Inventors: Huaning Niu, San Jose, CA (US); Dawei Zhang, Saratoga, CA (US); Jie Cui, San Jose, CA (US); Manasa Raghavan, Sunnyvale, CA (US); Qiming Li, Beijing (CN); Sigen Ye, San Diego, CA (US); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 18/693,492

(22) PCT Filed: Sep. 24, 2021

(86) PCT No.: PCT/CN2021/120222
§ 371 (c)(1),
(2) Date: Mar. 19, 2024

(87) PCT Pub. No.: WO2023/044727
PCT Pub. Date: Mar. 30, 2023

(65) Prior Publication Data
US 2024/0284234 A1　Aug. 22, 2024

(51) Int. Cl.
H04W 24/10　　(2009.01)
H04B 7/06　　(2006.01)

(52) U.S. Cl.
CPC ........ H04W 24/10 (2013.01); H04B 7/06964 (2023.05)

(58) Field of Classification Search
CPC ..... H04W 24/10; H04W 24/08; H04W 24/02; H04W 76/28; H04W 76/27;
(Continued)

(56) References Cited

U.S. PATENT DOCUMENTS 11,968,625 B2 * 4/2024 Laselva ............. H04W 52/0254
12,028,809 B2 　 7/2024 Niu et al.
(Continued)

FOREIGN PATENT DOCUMENTS

CN　　109923820 A　　6/2019
CN　　110519787 A　　11/2019
(Continued)

OTHER PUBLICATIONS

International Patent Application No. PCT/CN2021/120222, International Preliminary Report on Patentability, Apr. 4, 2024, 5 pages.
(Continued)

*Primary Examiner* — Olumide Ajibade Akonai
(74) *Attorney, Agent, or Firm* — Kilpatrick Townsend & Stockton LLP

(57)　　　　ABSTRACT
A method for a user equipment (UE) includes: determining that a first set of criteria is met for relaxing an evaluation; in response to the determining that the first set of criteria is met, entering a relaxation mode in which the evaluation is performed by the UE using a relaxed evaluation period, the relaxed evaluation period longer than a normal evaluation period with which the evaluation is not relaxed; determining that a second set of criteria is met for not relaxing the evaluation; and in response to the determining that the second set of criteria is met, exiting the relaxation mode to perform the evaluation using the normal evaluation period.

20 Claims, 6 Drawing Sheets

200

DETERMINE THAT A FIRST SET OF CRITERIA IS MET FOR RELAXING AN EVALUATION —210

IN RESPONSE TO DETERMINING THAT THE FIRST SET OF CRITERIA IS MET, ENTER A RELAXATION MODE IN WHICH THE EVALUATION IS PERFORMED BY THE UE USING A RELAXED EVALUATION PERIOD, THE RELAXED EVALUATION PERIOD LONGER THAN A NORMAL EVALUATION PERIOD WITH WHICH THE EVALUATION IS NOT RELAXED —220

DETERMINE THAT A SECOND SET OF CRITERIA IS MET FOR NOT RELAXING THE EVALUATION —230

IN RESPONSE TO DETERMINING THAT THE SECOND SET OF CRITERIA IS MET, EXIT THE RELAXATION MODE TO PERFORM THE EVALUATION USING THE NORMAL EVALUATION PERIOD —240

(58) Field of Classification Search
CPC ............. H04W 52/0235; H04W 52/02; H04W 52/0245; H04W 52/241; H04B 17/328; H04B 17/336; H04B 17/318; Y02D 30/70
See application file for complete search history.

(56) References Cited

U.S. PATENT DOCUMENTS

| | | | | | |
|---|---|---|---|---|---|
| 12,213,075 | B2* | 1/2025 | Sabouri-Sichani | ... | H04W 24/08 |
| 2022/0104044 | A1* | 3/2022 | Huang | ................. | H04W 24/08 |
| 2022/0124514 | A1* | 4/2022 | Lee | ................... | H04W 74/0841 |
| 2023/0019889 | A1* | 1/2023 | He | ..................... | H04B 7/06964 |
| 2024/0073729 | A1* | 2/2024 | Hu | ........................ | H04W 24/08 |
| 2024/0172020 | A1* | 5/2024 | Li | ..................... | H04W 36/0085 |
| 2024/0357494 | A1 | 10/2024 | Niu et al. | | |

FOREIGN PATENT DOCUMENTS

| | | | |
|---|---|---|---|
| CN | 111742516 | A | 10/2020 |
| WO | 2020068472 | A1 | 4/2020 |
| WO | 2020089513 | A1 | 5/2020 |
| WO | 2021064281 | A1 | 4/2021 |
| WO | 2021064283 | A1 | 4/2021 |

OTHER PUBLICATIONS

China Patent Application No. 202080105972.0, Office Action, Jul. 3, 2024, 9 pages.
China Patent Application No. 202080105972.0, Office Action, Feb. 25, 2025, 9 pages.
3GPP TS 38.133 V16.4.0, 3rd Generation Partnership Project, Technical Specification Group Radio Access Network, NR; Requirements for support of radio resource management ( Release 16), Jun. 2020, 1463 pages.
3GPP TS 38.300 V16.3.0, 3rd Generation Partnership Project; Technical Specification Group Radio Access Network; NR; NR and NG-RAN Overall Description; Stage 2 (Release 16), Sep. 2020, 148 pages.
3GPP TS 38.304 V16.2.0, 3rd Generation Partnership Project; Technical Specification Group Radio Access Network; NR; User Equipment (UE) procedures in Idle mode and RRC Inactive state (Release 16), Sep. 2020, 39 pages.
3GPP TS 38.331 V16.2.0, 3rd Generation Partnership Project; Technical Specification Group Radio Access Network; NR; Radio Resource Control (RRC) protocol specification (Release 16), Sep. 2020, 921 pages.
Discussion on RLM/BFD Relaxation, Vivo, 3GPP TSG RAN WG1 #102, R1-2005392, Aug. 2020, 4 pages.
Email Discussion Summary for [99-e][231] NR_UE_pow_sav_enh_RRM, Moderator (MediaTek inc.), 3GPP TSG-RAN WG4 Meeting # 99-e; R4-2108403, May 27, 2021, 66 pages.
On OOS and IS Indication Interval for NR RLM, Intel Corporation, 3GPP TSG-RAN4 Meeting #85, R4-1712362, Nov. 2017, 4 pages.
Revised WID UE Power Saving Enhancements for NR, MediaTek Inc., 3GPP TSG RAN meeting #88e Electronic Meeting, RP-200938, Jun. 29-Jul. 3, 2020, 5 pages.
RLM Requirement for IAB-MT, Samsung,3GPP TSG-RAN WG4 Meeting #95e ,R4-2006433, May 2020, 5 pages.
RRM Requirements on Inter-Frequency Measurement Without Gap, CMCC, 3GPP TSG-RAN WG4 Meeting #94-e,R4-2000644, Feb. 2020, 6 pages.
International Patent Application No. PCT/CN2020/119869, International Search Report and Written Opinion, Mailed on Jul. 2, 2021, 9 pages.
International Patent Application No. PCT/CN2021/120222, International Search Report and Written Opinion, May 27, 2022, 9 pages.
Email discussion summary for [100-e][228] NR_UE_pow_sav_enh_RRM, Media Tek Inc., 3GPP TSG-RAN WG4 Meeting # 100-e, R4-211xxxx, Aug. 16-27, 2021, 43 pages.
3GPP TS 38.133 V16.6.0, 3rd Generation Partnership Project, Technical Specification Group Radio Access Network; NR; Requirements for support of radio resource management ( Release 16), Dec. 2020, 1844 pages.
3GPP TS 38.133 V17.2.0, 3rd Generation Partnership Project, Technical Specification Group Radio Access Network; NR; Requirements for support of radio resource management ( Release 17), Jun. 2021, 3177 pages.
CSI-RS Measurement Outside C-DRX Active Time, 3GPP TSG-RAN WG4 Meeting #92bis, R4-1912554, Oct. 14-18, 2019, 3 pages.
Malaysia Patent Application No. PI2023001791, Substantive Examination Adverse Report, Feb. 27, 2026, 6 pages.

* cited by examiner

200

300

TRANSMIT, TO A USER EQUIPMENT (UE), A
CONFIGURATION INDICATING AT LEAST PART OF A FIRST
SET OF CRITERIA FOR RELAXING AN EVALUATION

310

TRANSMIT, TO THE UE, A CONFIGURATION
INDICATING AT LEAST PART OF A SECOND SET OF
CRITERIA FOR NOT RELAXING THE EVALUATION

320

RELAXATION CRITERION FOR UE POWER SAVING

CROSS-REFERENCE TO RELATED APPLICATION

This application is a 371 U.S. National Phase of PCT International Patent Application No. PCT/CN2021/120222, filed Sep. 24, 2021, which is herein incorporated by reference in its entirety for all purposes.

TECHNICAL FIELD

The present disclosure relates to the field of wireless communication, and more specifically, to relaxation criterion for UE power saving.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to some embodiments of the present disclosure, a method for a user equipment (UE) is provided. The method comprises: determining that a first set of criteria is met for relaxing an evaluation of a radio link quality; in response to the determining that the first set of criteria is met, entering a relaxation mode in which the evaluation is performed by the UE using a relaxed evaluation period, the relaxed evaluation period longer than a normal evaluation period with which the evaluation is not relaxed; determining that a second set of criteria is met for not relaxing the evaluation; and in response to the determining that the second set of criteria is met, exiting the relaxation mode to perform the evaluation using the normal evaluation period.

According to some embodiments of the present disclosure, a method for a network device is provided. The method comprises: transmitting, to a user equipment (UE), a configuration indicating at least part of a first set of criteria for relaxing an evaluation of a radio link quality, such that the UE is configured to, responsive to determining that the first set of criteria is met, enter a relaxation mode in which the evaluation is performed by the UE using a relaxed evaluation period, the relaxed evaluation period longer than a normal evaluation period with which the evaluation is not relaxed; and transmitting, to the UE, a configuration indicating at least part of a second set of criteria for not relaxing the evaluation, such that the UE is configured to, responsive to determining that the second set of criteria is met, exit the relaxation mode to perform the evaluation using the normal evaluation period.

According to some embodiments of the present disclosure, an apparatus for a communication device is provided that comprises means for performing the steps of the method as described above.

According to some embodiments of the present disclosure, a computer readable medium having computer programs stored thereon is provided that when executed by an apparatus having one or more processors, cause the apparatus to perform the steps of the method as described above.

According to some embodiments of the present disclosure, a computer program product comprising computer programs is provided that when executed by an apparatus having one or more processors, cause the apparatus to perform the steps of the method as described above.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

DETAILED DESCRIPTION

In the present disclosure, a "network device" or "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE).

As used herein, the terms "user equipment", "network device" and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user. A UE may be mobile or may (e.g., at certain times) be stationary, and may communicate with a Radio Access Network (RAN).

As used herein, the term "and/or" or "at least one of" includes any and all combinations of one or more of the associated listed items.

As used herein, the term "relax an evaluation" or its variants means performing the evaluation using a longer or relaxed evaluation period. For example, the term "relax BFD" or "relaxation of BFD" may mean that BFD is performed using a longer or relaxed evaluation period. Similarly, the term "relax RLM" or "relaxation of RLM" may mean that RLM is performed using a longer or relaxed evaluation period.

On one hand, it is desired to use a longer or relaxed evaluation period to relax the evaluation for saving UE power. On the other hand, relaxation of the evaluation might cause adverse effects in some circumstances. For example, in Frequency Range 2 (FR2), a beam used by the UE may change fast when UE rotation happens. In such a case, a longer evaluation period may worsen system performance and the relaxation may be unwanted. However, as advanced beam management which handles better reception (Rx) beam tracking arises, the UE is allowed to perform relaxation under some circumstances. Therefore, it would be desirable that the UE only performs relaxation when it is capable and allowed.

Embodiments of the present disclosure propose a solution for relaxing the evaluation, so as to provide enhanced power saving for a UE in connected mode without causing significant impact on system performance. The relaxation criterion for determining whether to relax the evaluation may involve a serving cell quality criterion and a low mobility criterion. The serving cell quality (i.e., radio link quality) criterion is the main focus of the present disclosure. The low $1o$ mobility criterion is agreed to reuse 3GPP Release-16 low mobility criterion and will be discussed briefly herein later. Now principles and implementations of the present disclosure will be described in detail below with reference to the drawings.

Figure 1:
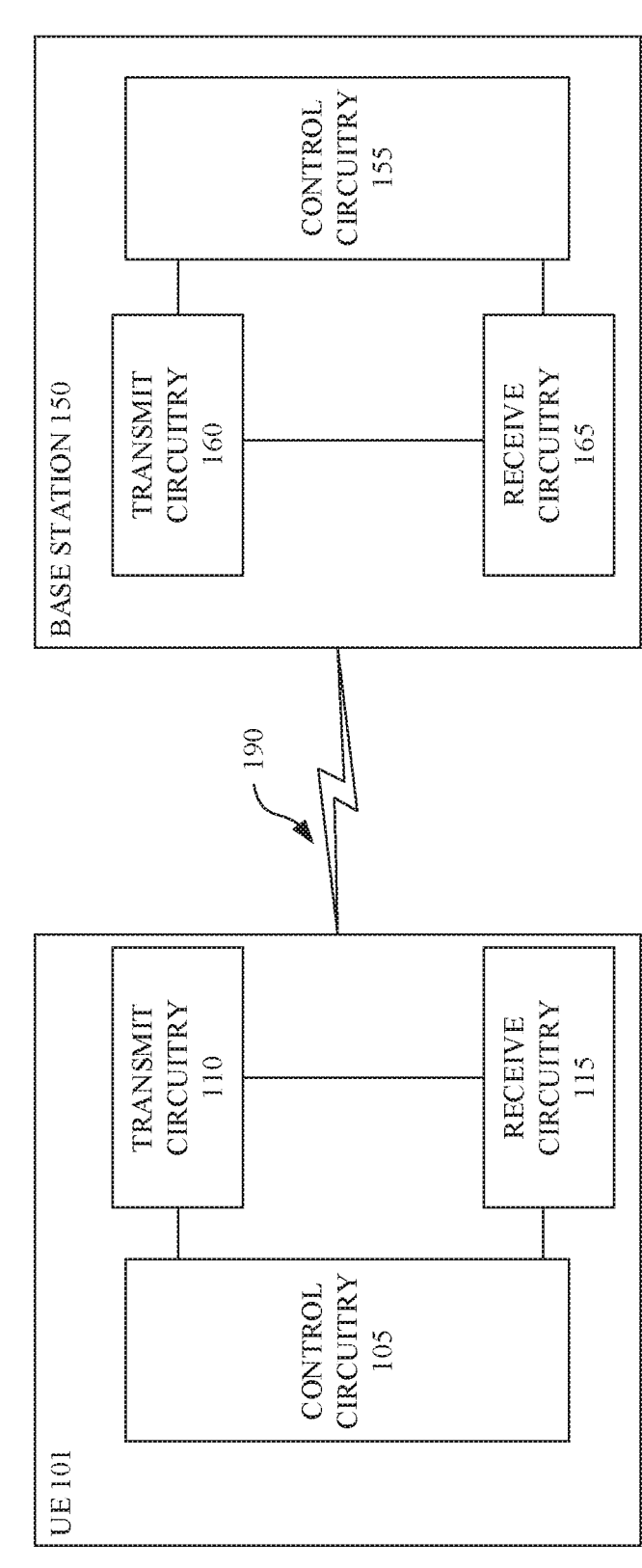
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

Figure 2:
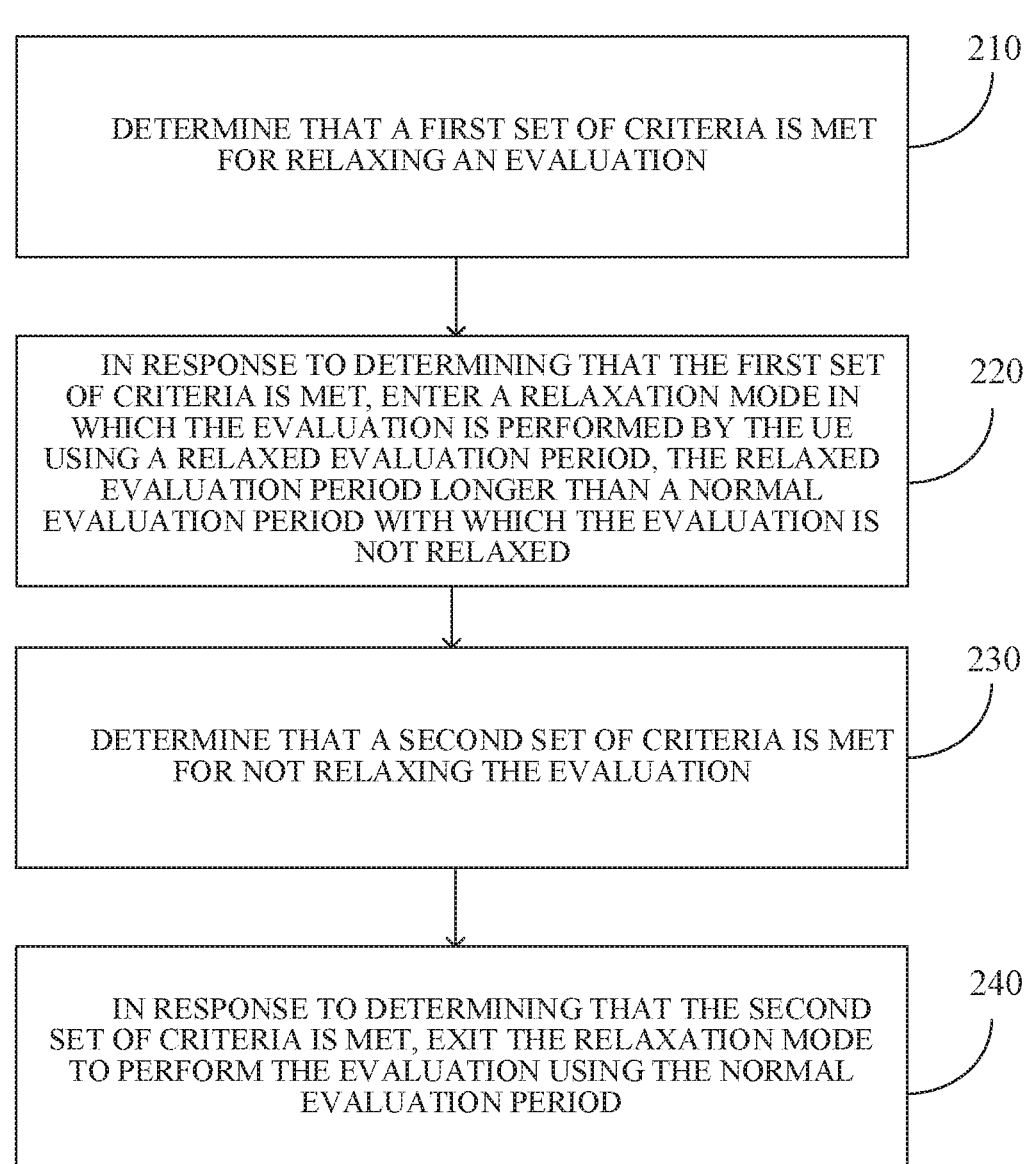
FIG. 2 is a flow chart illustrating a method performed at a UE in accordance with some embodiments.

FIG. 2 is a flow chart illustrating a method 200 performed at a UE in accordance with some embodiments. For the purpose of discussion, the method 200 will be described with reference to FIG. 1. For example, the UE may be the UE 101 shown in FIG. 1. It is to be understood that the method 200 may include additional blocks not shown and/or may omit some shown blocks, and the scope of the present disclosure is not limited in this regard.

At block 210, the UE 101 determines that a first set of criteria is met for relaxing an evaluation. In some embodiments, for serving cell quality, the evaluation may comprise at least one of radio link monitoring (RLM) or beam failure detection (BFD). As mentioned above, relaxation of BFD may refer to that BFD is performed using a longer or relaxed evaluation period. Similarly, relaxation of RLM may refer to that RLM is performed using a longer or relaxed evaluation period.

In some embodiments, the first set of criteria may comprise a set of entering relaxation criteria regarding serving cell quality. The serving cell quality may refer to the quality of a radio link between the UE 101 and a serving cell of a network device (e.g., base station 150 in FIG. 1) that is serving the UE 101.

At block 220, in response to the determining that the first set of criteria is met, the UE 101 enters a relaxation mode in which the evaluation is performed by the UE 101 using a relaxed evaluation period. The relaxed evaluation period is longer than a normal evaluation period with which the evaluation is not relaxed.

At block 230, the UE determines that a second set of criteria is met for not relaxing the evaluation. In some embodiments, the second set of criteria, different from the first set of criteria, may comprise a set of exiting relaxation criteria regarding serving cell quality.

At block 240, in response to the determining that the second set of criteria is met, the UE exits the relaxation mode to perform the evaluation using the normal evaluation period. The normal evaluation period is shorter than the relaxed evaluation period.

According to the method 200, the UE 101 may evaluate whether the serving cell quality estimated over the last normal evaluation period becomes better than the entering relaxation criterion within the current normal evaluation period. For example, the UE 101 evaluates whether the estimated serving cell quality is higher than a threshold signal-to-noise (SNR) corresponding to the entering relaxation criterion. If not, the UE 101 remains in a normal mode in which the evaluation is not relaxed. If yes, the UE 101 may enter the relaxation mode and then perform the evaluation using the relaxed evaluation period. In the relaxation mode, the UE 101 may evaluate whether the serving cell quality estimated over the last relaxed evaluation period becomes worse than the exiting relaxation period within the current relaxed evaluation period. For example, the UE 101 evaluates whether the estimated serving cell quality is lower than a threshold SNR corresponding to the exiting relaxation criterion. If not, the UE 101 remains in the relaxation mode. If yes, the UE 101 may revert back to the normal mode and then perform the evaluation using the normal evaluation period.

In some embodiments, the set of entering relaxation criteria regarding serving cell quality comprises an entering relaxation criterion for RLM, and the set of exiting relaxation criteria regarding serving cell quality comprises an exiting relaxation criterion for RLM. At least one of the entering relaxation criteria and the exiting relaxation criterion for RLM may be defined using hypothetical block error rate (BLER).

In some embodiments, the entering relaxation criterion for RLM may correspond to a threshold SNR. The threshold SNR may be determined by a hypothetical BLER of less than 2% (e.g., 1.5%, 1%, 0.5%) based on a first reference channel as defined in 3GPP TS 38.133, Release 17, Version 17.2.0, Table 8.1.2.1-2 ("PDCCH transmission parameters for in-sync evaluation for SSB based RLM-RS resources") or Table 8.1.3.1-2 ("PDCCH transmission parameters for in-sync evaluation for CSI-RS based RLM-RS resources").

Alternatively, the entering relaxation criterion for RLM may correspond to a threshold SNR determined by a hypothetical BLER of 2% (e.g., 1.5%, 1%, 0.5%) based on a second reference channel different from the first reference channel. The second reference channel has the same entries as the Table 8.1.2.1-2 or Table 8.1.3.1-2 but with at least one different entry value to provide a higher SNR than the first reference channel. For example, the second reference channel may have the CCE level of 2 instead of 4.

Alternatively, the entering relaxation criterion for RLM may correspond to a threshold SNR determined by the combination of the above mentioned two options. In other words, the threshold SNR is determined by a hypothetical BLER of less than 2% (e.g., 1.5%, 1%, 0.5%) based on the second reference channel. This may provide a sufficient margin above the SNR value corresponding to a hypothetical BLER of 2% based on the first reference channel as defined in the Table 8.1.2.1-2 or Table 8.1.3.1-2.

In some embodiments, the exiting relaxation criterion for RLM may use the same threshold SNR as the entering relaxation criterion for RLM. For example, the exiting relaxation criterion for RLM may be determined by any one of: a hypothetical BLER of less than 2% based on the first reference channel; a hypothetical BLER of 2% based on the second reference channel; and a hypothetical BLER of less than 2% based on the second reference channel. In such embodiments, when the estimated serving cell quality over the last normal evaluation period becomes better than the threshold SNR within the current normal evaluation period, the UE 101 enters the relaxation mode. Then, when the estimated serving cell quality over the last relaxed evaluation period becomes worse than the threshold SNR within the current relaxed evaluation period, the UE 101 exits the relaxation mode, thus reverting back to the normal mode.

In some embodiments, the exiting relaxation criterion for RLM may use a less threshold SNR than the entering relaxation criterion for RLM. This exiting strategy is relatively conservative as compared to the above-mentioned case where the same threshold is used for both entering and exiting. In this way, the UE 101 is enabled to exit the relaxation mode earlier when the serving cell quality drops.

In some embodiments, the exiting relaxation criterion for RLM may correspond to a threshold SNR. The threshold SNR may be determined by any one of: a hypothetical BLER of less than 10% (e.g., 5%, 2%, 1%, 0.5%) based on a third reference channel as defined in 3GPP TS 38.133, Release 17, Version 17.2.0, Table 8.1.2.1-1 or Table 8.1.3.1-1; a hypothetical BLER of 2% based on a reference channel as defined in 3GPP TS 38.133, Release 17, Version 17.2.0, Table 8.1.2.1-2 or Table 8.1.3.1-2; and a hypothetical BLER of less than 10% (e.g., 5%, 2%, 1%) based on a fourth reference channel different from the third reference channel, the fourth reference channel having same entries as the Table 8.1.2.1-1 or Table 8.1.3.1-1 but with at least one different entry value to provide a higher SNR than the third reference channel. In any of these three cases, the exiting relaxation criterion for RLM corresponds to a link condition which is higher than the SNR value corresponding to a hypothetical BLER of 10% based on the third reference channel as defined in the Table 8.1.2.1-1 or Table 8.1.3.1-1. In this way, the UE 101 is enabled to exit the relaxation mode before the radio link quality degrades. Otherwise, declaration of a radio link failure by the UE 101 may be postponed, causing negative impact to the system performance.

In some embodiments, the set of entering relaxation criteria regarding serving cell quality comprises an entering relaxation criterion for BFD. The set of exiting relaxation criteria regarding serving cell quality also comprises an exiting relaxation criterion for BFD.

In some embodiments, the entering relaxation criterion for BFD may correspond to a threshold SNR which is determined by a radio link quality threshold greater than a threshold $Q_{in\_LR}$ as identified in 3GPP TS 38.133, Release 17, Version 17.2.0, Section 8.5.1. In 3GPP TS 38.133, $Q_{in\_LR}$ is indicated by a higher layer parameter rsrp-ThresholdSSB. The threshold $Q_{in\_LR}$ may be applied to L1-RSRP measurement obtained from a synchronization signaling block (SSB). The threshold $Q_{in\_LR}$ may also be applied to the L1-RSRP measurement obtained for a CSI-RS resource after scaling a respective CSI-RS reception power with a value provided by a higher layer parameter powerControlOfTsetSS. Being greater than $Q_{in\_LR}$, the entering relaxation criterion for BFD allows the relaxation to happen only in a good link quality. Otherwise, the beam management performance may be degraded.

Alternatively, the entering relaxation criterion for BFD may be defined by a hypothetical BLER. In some embodiments, the entering relaxation criterion corresponds to a threshold SNR determined by a hypothetical BLER of less than 10% (e.g., 5%, 2%, 1%, 0.5%) based on a fifth reference channel as defined in 3GPP TS 38.133, Release 17, Version 17.2.0, Table 8.5.2.1-1 ("PDCCH transmission parameters for beam failure instance" (SSB based beam failure detection)) or Table 8.5.3.1-1 ("PDCCH transmission parameters for beam failure instance" (CSI-RS based beam failure detection)).

Alternatively, the entering relaxation criterion for BFD may be determined by the combination of a smaller hypothetical BLER and a selected new reference channel, for example, a hypothetical BLER of less than 10% (e.g., 5%, 2%, 1%, 0.5%) based on a sixth reference channel different from the fifth reference channel as described above. The sixth reference channel has the same entries as the Table 8.5.2.1-1 or Table 8.5.3.1-1 but with at least one different entry value to provide a higher SNR than the threshold $Q_{in\_LR}$. For example, the sixth reference channel may have a different aggregation level (CCE) value than the one as defined in the Table 8.5.2.1-1 or Table 8.5.3.1-1.

Similar to the case with RLM, the exiting relaxation criterion for BFD may correspond to the same threshold SNR as the entering relaxation criterion for BFD as described above.

Alternatively, the exiting relaxation criterion for BFD corresponds to a less threshold SNR than the entering relaxation criterion for BFD. In some embodiments, the exiting relaxation criterion for BFD may correspond to a threshold SNR determined by a threshold $Q_{in\_LR}$ as identified in 3GPP TS 38.133, Release 17, Version 17.2.0, Section 8.5.1. $Q_{in\_LR}$ is indicated by the higher layer parameter rsrp-ThresholdSSB. Alternatively, the exiting relaxation criterion for BFD may correspond to a hypothetical block error rate (BLER) of 10% based on a seventh reference channel as defined in 3GPP TS 38.133, Release 17, Version 17.2.0, Table 8.5.2.1-1 or Table 8.5.3.1-1. Alternatively, the exiting relaxation criterion for BFD may yet correspond to a hypothetical BLER of less than 10% (e.g., 5%, 2%, 1%, 0.5%) based on an eighth reference channel different from the seventh reference channel. The eighth reference channel has the same entries as the Table 8.5.2.1-1 or Table 8.5.3.1-1 but with at least one different entry value to provide a higher SNR than the seventh reference channel. For example, the eighth reference channel may have a different aggregation level (CCE) value than the one as defined in the Table 8.5.2.1-1 or Table 8.5.3.1-1.

In some embodiments, the entering relaxation criteria for RLM/BFD and the exiting criteria for RLM/BFD are used together. For example, the set of entering relaxation criteria regarding serving cell quality comprises an entering relaxation criterion for RLM and an entering relaxation criterion for BFD, and the set of exiting relaxation criteria regarding serving cell quality comprises an exiting relaxation criterion for RLM and an exiting relaxation criterion for BFD.

Alternatively, the entering relaxation criteria for RLM/BFD and the exiting relaxation criteria for RLM/BFD are combined respectively. For example, the higher one of the entering relaxation criteria for RLM/BFD, i.e., max(entering relaxation criterion for RLM, entering relaxation criterion for BFD), is selected as the final entering relaxation criterion. Similarly, the lower one of the exiting relaxation criterion for RLM/BFD, i.e., min(exiting relaxation criterion for RLM, exiting relaxation criterion for BFD), is selected as the final exiting relaxation criterion.

In some embodiments, the serving cell quality criterion for entering and/or exiting RLM relaxation may be configured by a network device (e.g., base station 150 in FIG. 1). In some embodiments, the value of the hypothetical BLER may be configured by the network device. For example, the value of the hypothetical BLER of less than 2% and/or the value of the hypothetical BLER of less than 10% can be configured by the network device. Other values than the hypothetical BLER may also be configured by the network device. When not configured by the network device, the serving cell quality criterion for entering and/or exiting RLM relaxation may be set as a default value(s) defined in the 3GPP Technical Specification.

In some embodiments, the serving cell quality criterion for entering and/or exiting RLM relaxation may be predefined in the 3GPP Technical Specification and does not need to be configured by the network device.

Similarly, the serving cell quality criterion for entering and/or exiting BFD relaxation may also be configured by a network device. For example, the value of the radio link quality threshold and/or the value of the hypothetical BLER of less than 10% may be configured by the network device.

In some embodiments, the serving cell quality criterion for entering and/or exiting BFD relaxation may be predefined in the 3GPP Technical Specification and does not need to be configured by the network device.

In some embodiments, the RLM is performed on an RLM reference signal (RLM-RS) as specified in 3GPP TS 38.213, Release 16, Version 16.6.0, Section 5, and the BFD is performed on a BFD reference signal (BFD-RS) in the set $q_0$, as specified in 3GPP TS 38.213, Release 16, Version 16.6.0, Section 6.

In some embodiments, for the set of entering relaxation criteria regarding serving cell quality, the RLM is performed using the evaluation period as defined by any one of: entry $T_{Evaluate\_in\_SSB}$ in 3GPP TS 38.133, Release 17, Version 17.2.0, Table 8.1.2.2-1; entry $T_{Evaluate\_in\_SSB}$ in 3GPP TS 38.133, Release 17, Version 17.2.0, Table 8.1.2.2-2; entry $T_{Evaluate\_in\_CSI-RS}$ in 3GPP TS 38.133, Release 17, Version 17.2.0, Table 8.1.3.2-1; and entry $T_{Evaluate\_in\_CSI-RS}$ in 3GPP TS 38.133, Release 17, Version 17.2.0, Table 8.1.3.2-2. Alternatively, the evaluation period may be longer than the examples given above.

In some embodiments, for the set of exiting relaxation criteria regarding serving cell quality, the RLM is performed using the measurement window determined by a relaxation factor K and an evaluation period as defined by any one of: entry $T_{Evaluate\_out\_SSB}$ in 3GPP TS 38.133, Release 17, Version 17.2.0, Table 8.1.2.2-1; entry $T_{Evaluate\_out\_SSB}$ in 3GPP TS 38.133, Release 17, Version 17.2.0, Table 8.1.2.2-2; entry $T_{Evaluate\_out\_CSI-RS}$ in 3GPP TS 38.133, Release 17, Version 17.2.0, Table 8.1.3.2-1; and entry $T_{Evaluate\_out\_CSI-RS}$ in 3GPP TS 38.133, Release 17, Version 17.2.0, Table 8.1.3.2-2. Alternatively, the measurement window may be longer than the examples given above. The longer measurement window may be obtained by applying an L3 filter. In one example, the L3-RSRP evaluation period may be used as the measurement window. By using a longer measurement window, a ping-pong effect (frequently jump in and jump out) may be avoided.

In some embodiments, for the set of exiting relaxation criteria regarding serving cell quality, the BFD is performed using the measurement window determined by a relaxation factor K and an evaluation period as defined by any one of: entry $T_{Evaluate\_BFD\_SSB}$ in 3GPP TS 38.133, Release 17, Version 17.2.0, Table 8.5.2.2-1; entry $T_{Evaluate\_BFD\_CSI-RS}$ in 3GPP TS 38.133, Release 17, Version 17.2.0, Table 8.5.2.2-2; entry $T_{Evaluate\_BFD\_CSI-RS}$ in 3GPP TS 38.133, Release 17, Version 17.2.0, Table 8.5.3.2-1; and entry $T_{Evaluate\_BFD\_CSI-RS}$ in 3GPP TS 38.133, Release 17, Version 17.2.0, Table 8.5.3.2-2. Alternatively, the measurement window may be longer than the examples given above. The longer measurement window may be obtained by applying an L3 filter. In one example, the L3-RSRP evaluation period may be used as the measurement window. By using a longer measurement window, a ping-pong effect (frequently jump in and jump out) may be avoided.

In some embodiments, the relaxation factor K is as defined in 3GPP TSG RAN WG4 #100-e agreement. RAN WG4 specifies the new evaluation period based on Max(T, Ceil([Y]×P×N)×Max($T_{DRX}$, $T_{RLM-RS/BFD-RS}$)), where Y is K*current Release-15 samples, and K is the predefined relaxation factor.

In some embodiments, a low mobility criterion may be used together with the serving cell quality criterion. For example, the first set of criteria being met comprises a low mobility criterion specifying that the UE is in a state of low mobility. As another example, the second set of criteria being met comprises the low mobility criterion specifying that the UE is not in a state of low mobility. This would be desirable since the UE is, in general, expected to only start relaxation in a good radio link quality and in low mobility.

The low mobility criterion is agreed to reuse 3GPP Release-16 low mobility criterion. There may, however, be a remaining issue on RSRP calculation. In some embodiments, an SSB quasi co-located to an RLM reference signal (RLM-RS) may be always used for calculation of reference signal received power (RSRP) for the low mobility criterion. Alternatively, an RLM-RS may be directly used for calculation of the RSRP for the low mobility criterion.

Figure 3:
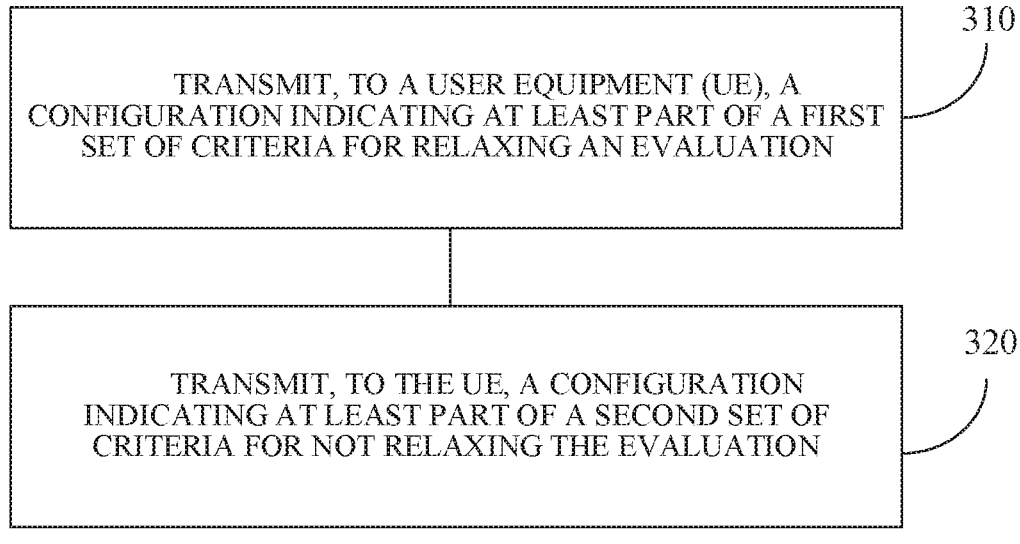
FIG. 3 is a flow chart illustrating a method performed at a network device in accordance with some embodiments.

FIG. 3 is a flow chart illustrating a method 300 performed at a network device in accordance with some embodiments. For purposes of discussion, the method 300 is described below with reference to FIG. 1. For example, the network device and the UE may be the base station 150 and the UE 101 in FIG. 1, respectively. It is to be understood that the method 300 may include additional blocks not shown and/or may omit some shown blocks, and the scope of the present disclosure is not limited in this regard.

As shown in FIG. 3, at block 310, the network device 150 transmits a configuration to the UE 101. The configuration indicates at least part of a first set of criteria for relaxing an evaluation. For example, the configuration may indicate at least part of a set of entering relaxation criteria regarding serving cell quality, and/or at least part of a low mobility criterion.

With this configuration, the UE 101 is configured to, responsive to determining that the first set of criteria is met, enter a relaxation mode in which the evaluation is performed by the UE 101 using a relaxed evaluation period. The relaxed evaluation period is longer than a normal evaluation period with which the evaluation is not relaxed.

At block 320, the network device 150 transmits a configuration to the UE 101. The configuration indicates at least part of a second set of criteria for not relaxing the evaluation. For example, the configuration may indicate at least part of a set of exiting relaxation criteria regarding serving cell quality, and/or at least part of a low mobility criterion.

With this configuration, the UE 101 is configured to, responsive to determining that the second set of criteria is met, exit the relaxation mode to perform the evaluation using the normal evaluation period.

It will be understood that blocks 310 and 320 may not be performed in sequence or separately as illustrated in FIG. 3. For example, block 320 may be performed prior to block 310. As another example, the network device 150 may transmit one configuration to the UE 101, which configuration indicates both the first set of criteria for relaxing the evaluation and the second set of criteria for not relaxing the evaluation. As yet another example, the first set of criteria may have the same value(s) as the second set of criteria such that they can be indicated in a single configuration and transmitted to the UE 101 in a single transmission.

In some embodiments, the evaluation may comprise at least one of RLM or BFD. In some embodiments, the first set of criteria may comprise a set of entering relaxation criteria regarding serving cell quality, and the second set of criteria may comprise a set of exiting relaxation criteria regarding serving cell quality.

In some embodiments, the set of entering relaxation criteria regarding serving cell quality may comprise an entering relaxation criterion for RLM. The entering relaxation criterion for RLM corresponds to a threshold SNR determined by any one of: a hypothetical BLER of less than 2% based on a first reference channel as defined in 3GPP TS 38.133, Release 17, Version 17.2.0, Table 8.1.2.1-2 or Table 8.1.3.1-2; a hypothetical BLER of 2% based on a second reference channel different from the first reference channel, the second reference channel having same entries as the Table 8.1.2.1-2 or Table 8.1.3.1-2 but with at least one different entry value to provide a higher SNR than the first reference channel; and a hypothetical BLER of less than 2% based on the second reference channel.

Similarly, the set of exiting relaxation criteria regarding serving cell quality may comprise an exiting relaxation criterion for RLM. The exiting relaxation criterion for RLM corresponds to a threshold SNR determined by any one of: a hypothetical BLER of less than 10% based on a third reference channel as defined in 3GPP TS 38.133, Release 17, Version 17.2.0, Table 8.1.2.1-1 or Table 8.1.3.1-1; a hypothetical BLER of 2% based on a reference channel as defined in 3GPP TS 38.133, Release 17, Version 17.2.0, Table 8.1.2.1-2 or Table 8.1.3.1-2; and a hypothetical BLER of less than 10% based on a fourth reference channel different from the third reference channel, the fourth reference channel having same entries as the Table 8.1.2.1-1 or Table 8.1.3.1-1 but with at least one different entry value to provide a higher SNR than the third reference channel.

In some embodiments, the set of entering relaxation criteria regarding serving cell quality may comprise an entering relaxation criterion for BFD. The entering relaxation criterion for BFD corresponds to a threshold SNR determined by any one of: a radio link quality threshold greater than a threshold $Q_{in\_LR}$ as identified in 3GPP TS 38.133, Release 17, Version 17.2.0, Section 8.5.1; a hypothetical BLER of less than 10% based on a fifth reference channel as defined in 3GPP TS 38.133, Release 17, Version 17.2.0, Table 8.5.2.1-1 or Table 8.5.3.1-1; and a hypothetical BLER of less than 10% based on a sixth reference channel different from the fifth reference channel, the sixth reference channel having same entries as the Table 8.5.2.1-1 or Table 8.5.3.1-1 but with at least one different entry value to provide a higher SNR than the threshold $Q_{in\_LR}$.

Similarly, the set of exiting relaxation criteria regarding serving cell quality may comprise an exiting relaxation criterion for BFD. The exiting relaxation criterion for BFD corresponds to a threshold SNR determined by any one of: a threshold $Q_{in\_LR}$ as identified in 3GPP TS 38.133, Release 17, Version 17.2.0, Section 8.5.1; a hypothetical BLER of 10% based on a seventh reference channel as defined in 3GPP TS 38.133, Release 17, Version 17.2.0, Table 8.5.2.1-1 or Table 8.5.3.1-1; and a hypothetical BLER of less than 10% based on an eighth reference channel different from the seventh reference channel, the eighth reference channel having same entries as the Table 8.5.2.1-1 or Table 8.5.3.1-1 but with at least one different entry value to provide a higher SNR than the seventh reference channel.

In some embodiments, the serving cell quality criterion for entering and/or exiting RLM relaxation may be configured by the network device 150. In one example, the value of the hypothetical BLER may be configured by the network device. For example, as described above for RLM, the value of the hypothetical BLER of less than 2% or the value of the hypothetical BLER of less than 10% is configured to the UE 101 by the network device 150. In some embodiments, the serving cell quality criterion for entering and/or exiting BFD relaxation may also be configured by the network device 150. For example, as described above for BFD, the value of the radio link quality threshold or the value of the hypothetical BLER of less than 10% is configured to the UE 101 by the network device 150.

Figure 4:
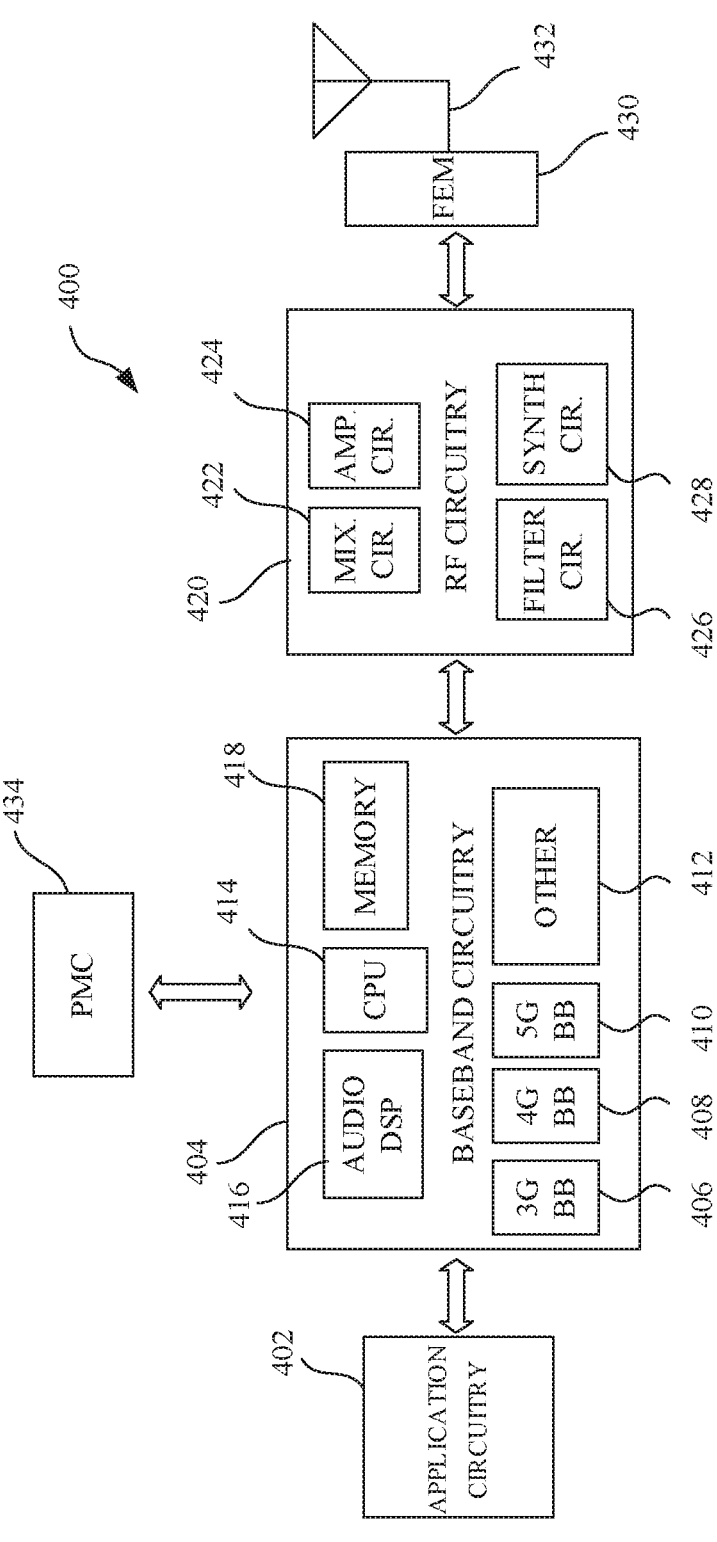
FIG. 4 is a block diagram illustrating a communication device (e.g., a UE or a base station) in accordance with some embodiments.

FIG. 4 illustrates example components of a device 400 in accordance with some embodiments. In some embodiments, the device 400 may include application circuitry 402, baseband circuitry 404, Radio Frequency (RF) circuitry (shown as RF circuitry 420), front-end module (FEM) circuitry (shown as FEM circuitry 430), one or more antennas 432, and power management circuitry (PMC) (shown as PMC 434) coupled together at least as shown. The components of the illustrated device 400 may be included in a UE or a RAN node. In some embodiments, the device 400 may include fewer elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 420 and to generate baseband signals for a transmit signal path of the RF circuitry 420. The baseband circuitry 404 may interface with the application circuitry 402 for generation and processing of the baseband signals and for controlling operations of the RF circuitry 420. For example, in some embodiments, the baseband circuitry 404 may include a third generation (3G) baseband processor (3G baseband processor 406), a fourth generation (4G) baseband processor (4G baseband processor 408), a fifth generation (5G) baseband processor (5G baseband processor 410), or other baseband processor(s) 412 for other existing generations, generations in development or to be developed in the future (e.g., second generation (2G), sixth generation (6G), etc.). The baseband circuitry 404 (e.g., one or more of baseband processors) may handle various radio control functions that enable communication with one or more radio networks via the RF circuitry 420. In other embodiments, some or all of the functionality of the illustrated baseband processors may be included in modules stored in the memory 418 and executed via a Central Processing ETnit (CPET 414). The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include a digital signal processor (DSP), such as one or more audio DSP(s) 416. The one or more audio DSP(s) 416 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 404 is configured to support radio communications of more than one wireless protocol may be referred to as multi-mode baseband circuitry.

The RF circuitry 420 may enable communication with wireless networks using modulated electromagnetic radiation through a non-solid medium. In various embodiments, the RF circuitry 420 may include switches, filters, amplifiers, etc. to facilitate the communication with the wireless network. The RF circuitry 420 may include a receive signal path which may include circuitry to down-convert RF signals received from the FEM circuitry 430 and provide baseband signals to the baseband circuitry 404. The RF circuitry 420 may also include a transmit signal path which may include circuitry to up-convert baseband signals provided by the baseband circuitry 404 and provide RF output signals to the FEM circuitry 430 for transmission.

In some embodiments, the receive signal path of the RF circuitry 420 may include mixer circuitry 422, amplifier circuitry 424 and filter circuitry 426. In some embodiments, the transmit signal path of the RF circuitry 420 may include filter circuitry 426 and mixer circuitry 422. The RF circuitry 420 may also include synthesizer circuitry 428 for synthesizing a frequency for use by the mixer circuitry 422 of the receive signal path and the transmit signal path. In some embodiments, the mixer circuitry 422 of the receive signal path may be configured to down-convert RF signals received from the FEM circuitry 430 based on the synthesized frequency provided by synthesizer circuitry 428. The amplifier circuitry 424 may be configured to amplify the down-converted signals and the filter circuitry 426 may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, the mixer circuitry 422 of the receive signal path may include passive mixers, although the scope of the embodiments is not limited in this respect.

In some embodiments, the mixer circuitry 422 of the transmit signal path may be configured to up-convert input baseband signals based on the synthesized frequency provided by the synthesizer circuitry 428 to generate RF output signals for the FEM circuitry 430. The baseband signals may be provided by the baseband circuitry 404 and may be filtered by the filter circuitry 426.

In some embodiments, the mixer circuitry 422 of the receive signal path and the mixer circuitry 422 of the transmit signal path may include two or more mixers and may be arranged for quadrature downconversion and upconversion, respectively. In some embodiments, the mixer circuitry 422 of the receive signal path and the mixer circuitry 422 of the transmit signal path may include two or more mixers and may be arranged for image rejection (e.g., Hartley image rejection). In some embodiments, the mixer circuitry 422 of the receive signal path and the mixer circuitry 422 may be arranged for direct downconversion and direct upconversion, respectively. In some embodiments, the mixer circuitry 422 of the receive signal path and the mixer circuitry 422 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 420 may include analog-to-digital converter (ADC) and digital-to-analog converter (DAC) circuitry and the baseband circuitry 404 may include a digital baseband interface to communicate with the RF circuitry 420.

In some dual-mode embodiments, a separate radio IC circuitry may be provided for processing signals for each spectrum, although the scope of the embodiments is not limited in this respect.

In some embodiments, the synthesizer circuitry 428 may be a fractional –N synthesizer or a fractional N/N+1 synthesizer, although the scope of the embodiments is not limited in this respect as other types of frequency synthesizers may be suitable. For example, synthesizer circuitry 428 may be a delta-sigma synthesizer, a frequency multiplier, or a synthesizer including a phase-locked loop with a frequency divider.

The synthesizer circuitry 428 may be configured to synthesize an output frequency for use by the mixer circuitry 422 of the RF circuitry 420 based on a frequency input and a divider control input. In some embodiments, the synthesizer circuitry 428 may be a fractional N/N+1 synthesizer.

In some embodiments, frequency input may be provided by a voltage controlled oscillator (VCO), although that is not a requirement. Divider control input may be provided by either the baseband circuitry 404 or the application circuitry 402 (such as an applications processor) depending on the desired output frequency. In some embodiments, a divider control input (e.g., N) may be determined from a look-up table based on a channel indicated by the application circuitry 402.

Synthesizer circuitry 428 of the RF circuitry 420 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 428 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 420 may include an IQ/polar converter.

The FEM circuitry 430 may include a receive signal path which may include circuitry configured to operate on RF signals received from one or more antennas 432, amplify the received signals and provide the amplified versions of the received signals to the RF circuitry 420 for further process-ing. The FEM circuitry 430 may also include a transmit signal path which may include circuitry configured to amplify signals for transmission provided by the RF cir-cuitry 420 for transmission by one or more of the one or more antennas 432. In various embodiments, the amplifica-tion through the transmit or receive signal paths may be done solely in the RF circuitry 420, solely in the FEM circuitry 430, or in both the RF circuitry 420 and the FEM circuitry 430.

In some embodiments, the FEM circuitry 430 may include a TX/RX switch to switch between transmit mode and receive mode operation. The FEM circuitry 430 may include a receive signal path and a transmit signal path. The receive signal path of the FEM circuitry 430 may include an LNA to amplify received RF signals and provide the ampli-fied received RF signals as an output (e.g., to the RF circuitry 420). The transmit signal path of the FEM circuitry 430 may include a power amplifier (PA) to amplify input RF signals (e.g., provided by the RF circuitry 420), and one or more filters to generate RF signals for subsequent transmis-sion (e.g., by one or more of the one or more antennas 432).

In some embodiments, the PMC 434 may manage power provided to the baseband circuitry 404. In particular, the PMC 434 may control power-source selection, voltage scal-ing, battery charging, or DC-to-DC conversion. The PMC 434 may often be included when the device 400 is capable of being powered by a battery, for example, when the device 400 is included in an EGE. The PMC 434 may increase the power conversion efficiency while providing desirable implementation size and heat dissipation characteristics.

FIG. 4 shows the PMC 434 coupled only with the baseband circuitry 404. However, in other embodiments, the PMC 434 may be additionally or alternatively coupled with, and perform similar power management operations for, other components such as, but not limited to, the application circuitry 402, the RF circuitry 420, or the FEM circuitry 430.

In some embodiments, the PMC 434 may control, or otherwise be part of, various power saving mechanisms of the device 400. For example, if the device 400 is in an RRC Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC Idle state, where it disconnects from the network and does not perform operations such as channel quality feedback, han-dover, etc. The device 400 goes into a very low power state and it performs paging where again it periodically wakes up to listen to the network and then powers down again. The device 400 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used to execute Layer 3, Layer 2, or Layer 1 functionality, while processors of the application circuitry 402 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data conver-gence protocol (PDCP) layer, described in further detail below. As referred to herein, Layer 1 may include a physical (PHY) layer of a UE/RAN node, described in further detail below.

Figure 5:
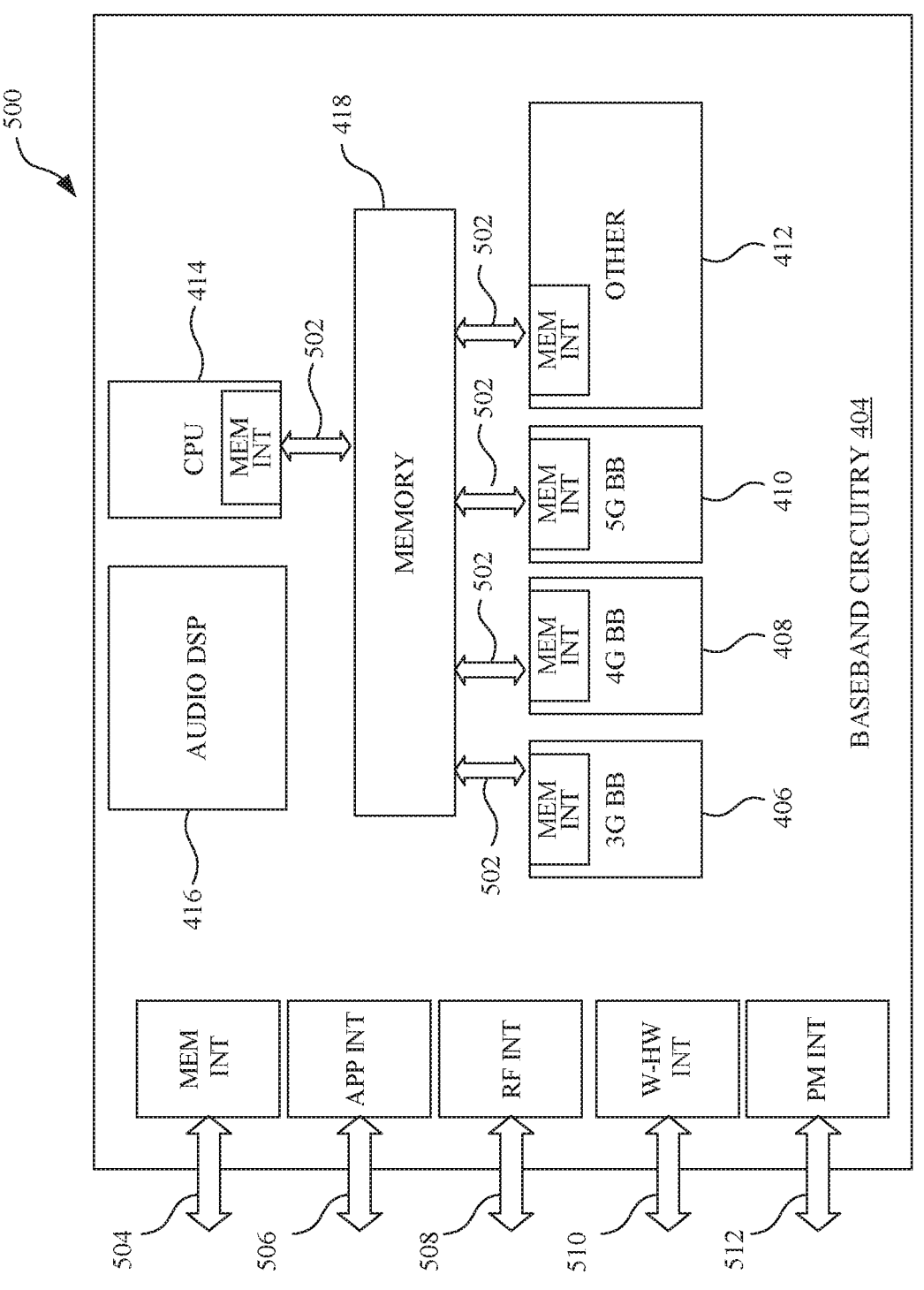
FIG. 5 illustrates example interfaces of baseband circuitry in accordance with some embodiments.

FIG. 5 illustrates example interfaces 500 of baseband circuitry in accordance with some embodiments. As dis-cussed above, the baseband circuitry 404 of FIG. 4 may include 3G baseband processor 406, 4G baseband processor 408, 5G baseband processor 410, other baseband processor(s) 412, CPU 414, and a memory 418 utilized by said processors. As illustrated, each of the processors may include a respective memory interface 502 to send/receive data to/from the memory 418.

The baseband circuitry 404 may further include one or more interfaces to communicatively couple to other circuit-ries/devices, such as a memory interface 504 (e.g., an interface to send/receive data to/from memory external to the baseband circuitry 404), an application circuitry inter-face 506 (e.g., an interface to send/receive data to/from the application circuitry 402 of FIG. 4), an RF circuitry interface 508 (e.g., an interface to send/receive data to/from RF circuitry 420 of FIG. 4), a wireless hardware connectivity interface 510 (e.g., an interface to send/receive data to/from Near Field Communication (NFC) components, Bluetooth® components (e.g., Bluetooth® Low Energy), Wi-Fi® com-ponents, and other communication components), and a power management interface 512 (e.g., an interface to send/receive power or control signals to/from the PMC 434.

Figure 6:
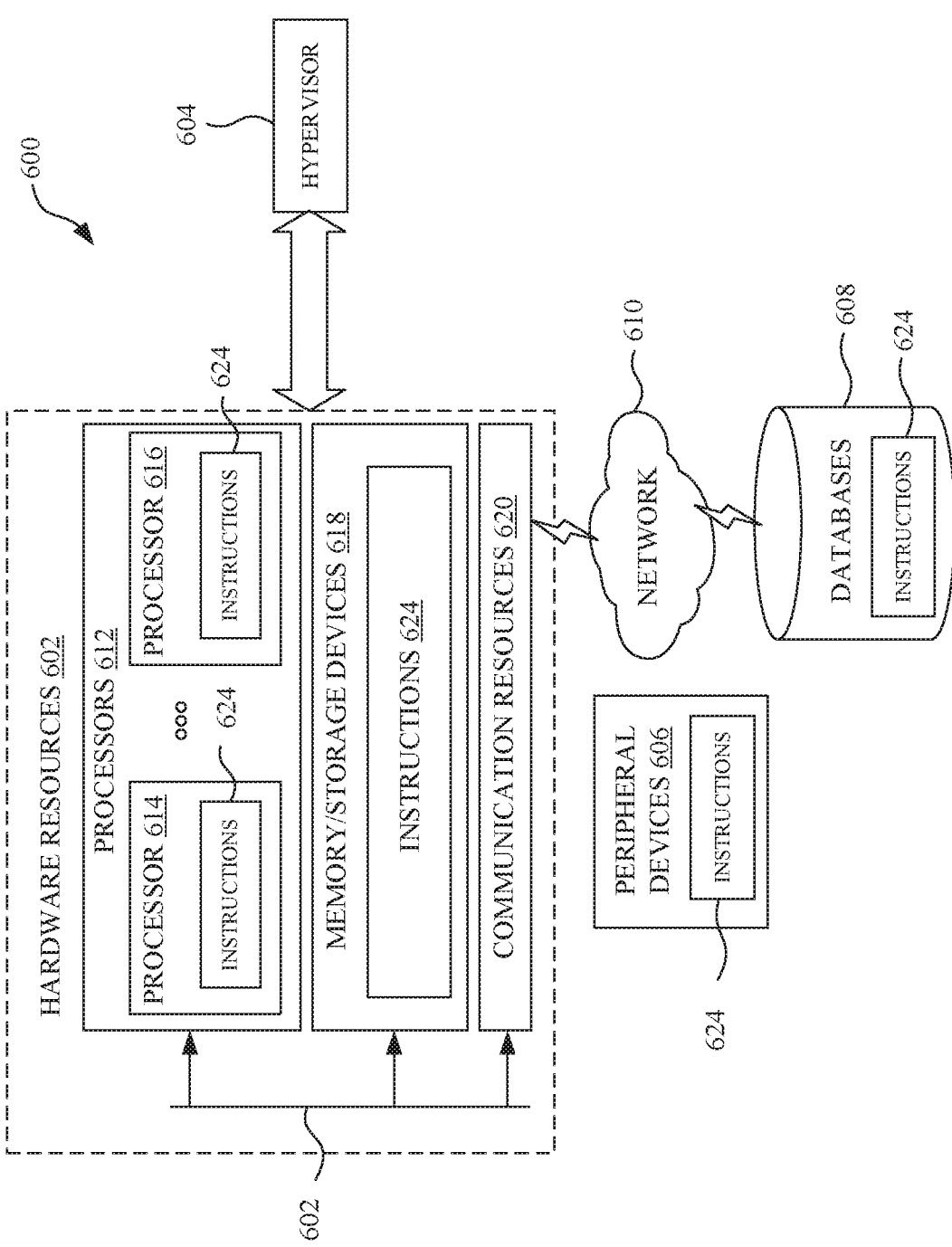
FIG. 6 illustrates components in accordance with some embodiments.

FIG. 6 is a block diagram illustrating components 600, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 602 including one or more processors 612 (or processor cores), one or more memory/storage devices 618, and one or more communica-tion resources 620, each of which may be communicatively coupled via a bus 622. For embodiments where node virtu-alization (e.g., NFV) is utilized, a hypervisor 604 may be executed to provide an execution environment for one or more network slices/sub-slices to utilize the hardware resources 602.

The processors 612 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated cir-cuit (RFIC), another processor, or any suitable combination thereof) may include, for example, a processor 614 and a processor 616.

The memory/storage devices 618 may include main memory, disk storage, or any suitable combination thereof. The memory/storage devices 618 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 620 may include interconnection or network interface components or other suitable devices to communicate with one or more peripheral devices 606 or one or more databases 608 via a network 610. For example, the communication resources 620 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 624 may include software, a program, an application, an applet, an app, or other executable code for causing at least any of the processors 612 to perform any one or more of the methodologies discussed herein. The instructions 624 may reside, completely or partially, within at least one of the processors 612 (e.g., within the processor's cache memory), the memory/storage devices 618, or any suitable combination thereof. Furthermore, any portion of the instructions 624 may be transferred to the hardware resources 602 from any combination of the peripheral devices 606 or the databases 608. Accordingly, the memory of the processors 612, the memory/storage devices 618, the peripheral devices 606, and the databases 608 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), comprising: determining that a first set of criteria is met for relaxing an evaluation; in response to the determining that the first set of criteria is met, entering a relaxation mode in which the evaluation is performed by the UE using a relaxed evaluation period, the relaxed evaluation period longer than a normal evaluation period with which the evaluation is not relaxed; determining that a second set of criteria is met for not relaxing the evaluation; and in response to the determining that the second set of criteria is met, exiting the relaxation mode to perform the evaluation using the normal evaluation period.

Example 2 is the method of example 1, wherein the first set of criteria comprises a set of entering relaxation criteria regarding serving cell quality, and wherein the second set of criteria comprises a set of exiting relaxation criteria regarding serving cell quality.

Example 3 is the method of example 2, wherein the evaluation comprises at least one of radio link monitoring (RLM) or beam failure detection (BFD).

Example 4 is the method of example 3, wherein the set of entering relaxation criteria regarding serving cell quality comprises an entering relaxation criterion for RLM, and wherein the set of exiting relaxation criteria regarding serving cell quality comprises an exiting relaxation criterion for RLM.

Example 5 is the method of example 4, wherein the entering relaxation criterion for RLM corresponds to a threshold signal-to-noise ratio (SNR) determined by any one of: a hypothetical block error rate (BLER) of less than 2% based on a first reference channel as defined in 3GPP TS 38.133, Release 17, Version 17.2.0, Table 8.1.2.1-2 or Table 8.1.3.1-2, a hypothetical BLER of 2% based on a second reference channel different from the first reference channel, the second reference channel having same entries as the Table 8.1.2.1-2 or Table 8.1.3.1-2 but with at least one different entry value to provide a higher SNR than the first reference channel, and a hypothetical BLER of less than 2% based on the second reference channel.

Example 6 is the method of example 4 or 5, wherein the exiting relaxation criterion for RLM corresponds to a same threshold SNR as the entering relaxation criterion for RLM.

Example 7 is the method of example 4 or 5, wherein the exiting relaxation criterion for RLM corresponds to a less threshold SNR than the entering relaxation criterion for RLM.

Example 8 is the method of example 7, wherein the exiting relaxation criterion for RLM corresponds to a threshold SNR determined by any one of: a hypothetical BLER of less than 10% based on a third reference channel as defined in 3GPP TS 38.133, Release 17, Version 17.2.0, Table 8.1.2.1-1 or Table 8.1.3.1-1, a hypothetical BLER of 2% based on a reference channel as defined in 3GPP TS 38.133, Release 17, Version 17.2.0, Table 8.1.2.1-2 or Table 8.1.3.1-2, and a hypothetical BLER of less than 10% based on a fourth reference channel different from the third reference channel, the fourth reference channel having same entries as the Table 8.1.2.1-1 or Table 8.1.3.1-1 but with at least one different entry value to provide a higher SNR than the third reference channel.

Example 9 is the method of example 3, wherein the set of entering relaxation criteria regarding serving cell quality comprises an entering relaxation criterion for BFD, and wherein the set of exiting relaxation criteria regarding serving cell quality comprises an exiting relaxation criterion for BFD.

Example 10 is the method of example 9, wherein the entering relaxation criterion for BFD corresponds to a threshold signal-to-noise ratio (SNR) determined by any one of: a radio link quality threshold greater than a threshold $Q_{in\_LR}$ as identified in 3GPP TS 38.133, Release 17, Version 17.2.0, Section 8.5.1, a hypothetical block error rate (BLER) of less than 10% based on a fifth reference channel as defined in 3GPP TS 38.133, Release 17, Version 17.2.0, Table 8.5.2.1-1 or Table 8.5.3.1-1, and a hypothetical block error rate (BLER) of less than 10% based on a sixth reference channel different from the fifth reference channel, the sixth reference channel having same entries as the Table 8.5.2.1-1 or Table 8.5.3.1-1 but with at least one different entry value to provide a higher SNR than the threshold $Q_{in\_LR}$.

Example 11 is the method of example 9 or 10, wherein the exiting relaxation criterion for BFD corresponds to a same threshold SNR as the entering relaxation criterion for BFD.

Example 12 is the method of example 9 or 10, wherein the exiting relaxation criterion for BFD corresponds to a less threshold SNR than the entering relaxation criterion for BFD.

Example 13 is the method of example 12, wherein the exiting relaxation criterion for BFD corresponds to a threshold SNR determined by any one of: a threshold $Q_{in\_LR}$ as identified in 3GPP TS 38.133, Release 17, Version 17.2.0, Section 8.5.1, a hypothetical block error rate (BLER) of 10% based on a seventh reference channel as defined in 3GPP TS 38.133, Release 17, Version 17.2.0, Table 8.5.2.1-1 or Table 8.5.3.1-1, and a hypothetical BLER of less than 10% based on an eighth reference channel different from the seventh reference channel, the eighth reference channel having same entries as the Table 8.5.2.1-1 or Table 8.5.3.1-1 but with at least one different entry value to provide a higher SNR than the seventh reference channel.

Example 14 is the method of example 3, wherein the set of entering relaxation criteria regarding serving cell quality comprises an entering relaxation criterion for RLM and an entering relaxation criterion for BFD, and wherein the set of exiting relaxation criteria regarding serving cell quality comprises an exiting relaxation criterion for RLM and an exiting relaxation criterion for BFD.

Example 15 is the method of example 3, wherein the set of entering relaxation criteria regarding serving cell quality comprises a higher one of an entering relaxation criterion for RLM and an entering relaxation criterion for BFD, and wherein the set of exiting relaxation criteria regarding serving cell quality comprises a lower one of an exiting relaxation criterion for RLM and an exiting relaxation criterion for BFD.

Example 16 is the method of example 5, wherein a value of the hypothetical BLER of less than 2% is configured to the UE by a network device or is predefined.

Example 17 is the method of example 8, wherein a value of the hypothetical BLER of less than 10% is configured to the UE by a network device or is predefined.

Example 18 is the method of example 10, wherein at least one of a value of the radio link quality threshold or a value of the hypothetical BLER of less than 10% is configured to the UE by a network device or is predefined.

Example 19 is the method of example 13, wherein a value of the hypothetical BLER of less than 10% is configured to the UE by a network device or is predefined.

Example 20 is the method of any of examples 3 to 19, wherein the RLM is performed on an RLM reference signal (RLM-RS) as specified in 3GPP TS 38.213, Release 16, Version 16.6.0, Section 5, and wherein the BFD is performed on a BFD reference signal (BFD-RS) in a set, as specified in 3GPP TS 38.213, Release 16, Version 16.6.0, Section 6.

Example 21 is the method of any of examples 3 to 20, wherein for the set of entering relaxation criteria regarding serving cell quality, the RLM is performed using one of: a first evaluation period as defined by any one of: entry $T_{Evaluate\_in\_SSB}$ in 3GPP TS 38.133, Release 17, Version 17.2.0, Table 8.1.2.2-1; entry $T_{Evaluate\_in\_SSB}$ in 3GPP TS 38.133, Release 17, Version 17.2.0, Table 8.1.2.2-2; entry $T_{Evaluate\_in\_CSI-RS}$ in 3GPP TS 38.133, Release 17, Version 17.2.0, Table 8.1.3.2-1; and entry $T_{Evaluate\_in\_CSI-RS}$ in 3GPP TS 38.133, Release 17, Version 17.2.0, Table 8.1.3.2-2, or a second evaluation period longer than the first evaluation period.

Example 22 is the method of any of examples 3 to 21, wherein for the set of exiting relaxation criteria regarding serving cell quality, the RLM is performed using one of: a first measurement window determined by a relaxation factor and an evaluation period as defined by any one of: entry $T_{Evaluate\_out\_SSB}$ in 3GPP TS 38.133, Release 17, Version 17.2.0, Table 8.1.2.2-1; entry $T_{Evaluate\_out\_SSB}$ in 3GPP TS 38.133, Release 17, Version 17.2.0, Table 8.1.2.2-2; entry $T_{Evaluate\_out\_CSI-RS}$ in 3GPP TS 38.133, Release 17, Version 17.2.0, Table 8.1.3.2-1; and entry $T_{Evaluate\_out\_CSI-RS}$ in 3GPP TS 38.133, Release 17, Version 17.2.0, Table 8.1.3.2-2, or a second measurement window longer than the first measurement window.

Example 23 is the method of any of examples 3 to 22, wherein for the set of exiting relaxation criteria regarding serving cell quality, the BFD is performed using one of: a third measurement window determined by a relaxation factor and an evaluation period as defined by any one of: entry $T_{Evaluate\_BFD\_SSB}$ in 3GPP TS 38.133, Release 17, Version 17.2.0, Table 8.5.2.2-1; entry $T_{Evaluate\_BFD\_SSB}$ in 3GPP TS 38.133, Release 17, Version 17.2.0, Table 8.5.2.2-2; entry $T_{Evaluate\_BFD\_CSI-RS}$ in 3GPP TS 38.133, Release 17, Version 17.2.0, Table 8.5.3.2-1; and entry $T_{Evaluate\_BFD\_CSI-RS}$ in 3GPP TS 38.133, Release 17, Version 17.2.0, Table 8.5.3.2-2, or a fourth measurement window longer than the third measurement window.

Example 24 is the method of example 22 or 23, wherein the relaxation factor is as defined in 3GPP TSG RAN WG4 #100-e agreement.

Example 25 is the method of any of examples 1 to 24, wherein the first set of criteria being met comprises a low mobility criterion specifying that the UE is in a state of low mobility, and wherein the second set of criteria being met comprises the low mobility criterion specifying that the UE is not in a state of low mobility.

Example 26 is the method of example 25, wherein for the low mobility criterion, a synchronization signal block (SSB) which is quasi co-located to an RLM reference signal (RLM-RS) is used for calculation of reference signal received power (RSRP).

Example 27 is the method of example 25, wherein for the low mobility criterion, an RLM reference signal (RLM-RS) is used for calculation of reference signal received power (RSRP).

Example 28 is a method for a network device, comprising: transmitting, to a user equipment (UE), a configuration indicating at least part of a first set of criteria for relaxing an evaluation, such that the UE is configured to, responsive to determining that the first set of criteria is met, enter a relaxation mode in which the evaluation is performed by the UE using a relaxed evaluation period, the relaxed evaluation period longer than a normal evaluation period with which the evaluation is not relaxed; and transmitting, to the UE, a configuration indicating at least part of a second set of criteria for not relaxing the evaluation, such that the UE is configured to, responsive to determining that the second set of criteria is met, exit the relaxation mode to perform the evaluation using the normal evaluation period.

Example 29 is the method of example 28, wherein the first set of criteria comprises a set of entering relaxation criteria regarding serving cell quality and the second set of criteria comprises a set of exiting relaxation criteria regarding serving cell quality, and wherein the evaluation comprises at least one of radio link monitoring (RLM) or beam failure detection (BFD).

Example 30 is the method of example 29, wherein the set of entering relaxation criteria regarding serving cell quality comprises an entering relaxation criterion for RLM and the set of exiting relaxation criteria regarding serving cell quality comprises an exiting relaxation criterion for RLM, wherein the entering relaxation criterion for RLM corresponds to a threshold signal-to-noise ratio (SNR) determined by any one of: a hypothetical block error rate (BLER) of less than 2% based on a first reference channel as defined in 3GPP TS 38.133, Release 17, Version 17.2.0, Table 8.1.2.1-2 or Table 8.1.3.1-2; a hypothetical BLER of 2% based on a second reference channel different from the first reference channel, the second reference channel having same entries as the Table 8.1.2.1-2 or Table 8.1.3.1-2 but with at least one different entry value to provide a higher SNR than the first reference channel; and a hypothetical BLER of less than 2% based on the second reference channel, and wherein the exiting relaxation criterion for RLM corresponds to a threshold SNR determined by any one of: a hypothetical BLER of less than 10% based on a third reference channel as defined in 3GPP TS 38.133, Release 17, Version 17.2.0, Table 8.1.2.1-1 or Table 8.1.3.1-1; a hypothetical BLER of 2% based on a reference channel as defined in 3GPP TS 38.133, Release 17, Version 17.2.0, Table 8.1.2.1-2 or Table 8.1.3.1-2; and a hypothetical BLER of less than 10% based on a fourth reference channel different from the third reference channel, the fourth reference channel having same entries as the Table 8.1.2.1-1 or Table 8.1.3.1-1 but with at least one different entry value to provide a higher SNR than the third reference channel.

Example 32 is the method of example 29, wherein the set of entering relaxation criteria regarding serving cell quality comprises an entering relaxation criterion for BFD and the set of exiting relaxation criteria regarding serving cell quality comprises an exiting relaxation criterion for BFD, wherein the entering relaxation criterion for BFD corresponds to a threshold signal-to-noise ratio (SNR) determined by any one of: a radio link quality threshold greater than a threshold $Q_{in\_LR}$ as identified in 3GPP TS 38.133, Release 17, Version 17.2.0, Section 8.5.1; a hypothetical block error rate (BLER) of less than 10% based on a fifth reference channel as defined in 3GPP TS 38.133, Release 17, Version 17.2.0, Table 8.5.2.1-1 or Table 8.5.3.1-1; and a hypothetical block error rate (BLER) of less than 10% based on a sixth reference channel different from the fifth reference channel, the sixth reference channel having same entries as the Table 8.5.2.1-1 or Table 8.5.3.1-1 but with at least one different entry value to provide a higher SNR than the threshold $Q_{in\_LR}$, and wherein the exiting relaxation criterion for BFD corresponds to a threshold SNR determined by any one of: a threshold $Q_{in\_LR}$ as identified in 3GPP TS 38.133, Release 17, Version 17.2.0, Section 8.5.1; a hypothetical block error rate (BLER) of 10% based on a seventh reference channel as defined in 3GPP TS 38.133, Release 17, Version 17.2.0, Table 8.5.2.1-1 or Table 8.5.3.1-1; and a hypothetical BLER of less than 10% based on an eighth reference channel different from the seventh reference channel, the eighth reference channel having same entries as the Table 8.5.2.1-1 or Table 8.5.3.1-1 but with at least one different entry value to provide a higher SNR than the seventh reference channel.

Example 32 is the method of example 30, wherein at least one of a value of the hypothetical BLER of less than 2% or a value of the hypothetical BLER of less than 10% is configured to the UE by the network device.

Example 33 is the method of example 31, wherein at least one of a value of the radio link quality threshold or a value of the hypothetical BLER of less than 10% is configured to the UE by the network device.

Example 34 is an apparatus for a user equipment (UE), the apparatus comprising one or more processors configured to perform the method of any of examples 1 to 27.

Example 35 is an apparatus for a network device, the apparatus comprising one or more processors configured to perform the method of any of examples 28 to 34.

Example 36 is an apparatus for a communication device, comprising means for performing the method of any of examples 1 to 34.

Example 37 is a computer readable medium having computer programs stored thereon which, when executed by an apparatus having one or more processors, cause the apparatus to perform the method of any of examples 1 to 34.

Example 38 is a computer program product comprising computer programs which, when executed by an apparatus having one or more processors, cause the apparatus to perform the method of any of examples 1 to 34.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

23

What is claimed is:

1. A method comprising:

determining, based on measurements in a measurement window, that a first set of criteria is met for relaxing an evaluation;

in response to the determining that the first set of criteria is met, entering a relaxation mode in which the evaluation is performed by a user equipment (UE) using a relaxed evaluation period, the relaxed evaluation period longer than a normal evaluation period with which the evaluation is not relaxed;

determining that a second set of criteria is met for not relaxing the evaluation; and in response to the determining that the second set of criteria is met, exiting the relaxation mode to perform the evaluation using the normal evaluation period, wherein the measurement window is longer than the normal evaluation period.

2. The method of claim 1, wherein the first set of criteria comprises a set of entering relaxation criteria regarding serving cell quality, and wherein the second set of criteria comprises a set of exiting relaxation criteria regarding serving cell quality.

3. The method of claim 2, wherein the evaluation comprises at least one of radio link monitoring (RLM) or beam failure detection (BFD).

4. The method of claim 3, wherein the set of entering relaxation criteria regarding serving cell quality comprises an entering relaxation criterion for RLM and an entering relaxation criterion for BFD, and wherein the set of exiting relaxation criteria regarding serving cell quality comprises an exiting relaxation criterion for RLM and an exiting relaxation criterion for BFD.

5. The method of claim 3, wherein the set of entering relaxation criteria regarding serving cell quality comprises a higher one of an entering relaxation criterion for RLM and an entering relaxation criterion for BFD, and wherein the set of exiting relaxation criteria regarding serving cell quality comprises a lower one of an exiting relaxation criterion for RLM and an exiting relaxation criterion for BFD.

6. The method of claim 2, wherein: the evaluation comprises radio link monitoring (RLM); the set of entering relaxation criteria regarding serving cell quality comprises an entering relaxation criterion for RLM; and the set of exiting relaxation criteria regarding serving cell quality comprises an exiting relaxation criterion for RLM.

7. The method of claim 6, wherein the entering relaxation criterion for RLM corresponds to a threshold signal-to-noise ratio (SNR) determined by a hypothetical block error rate (BLER) of less than 2% based on a reference channel.

8. The method of claim 6, wherein the exiting relaxation criterion for RLM corresponds to a less threshold SNR than the entering relaxation criterion for RLM.

9. The method of claim 8, wherein the exiting relaxation criterion for RLM corresponds to a threshold SNR determined by a hypothetical BLER of less than 10% based on a reference channel.

10. The method of claim 2, wherein: the evaluation comprises a beam failure detection (BFD); the set of entering relaxation criteria regarding serving cell quality comprises an entering relaxation criterion for BFD; and the set of exiting relaxation criteria regarding serving cell quality comprises an exiting relaxation criterion for BFD.

11. The method of claim 10, wherein the entering relaxation criterion for BFD corresponds to a threshold signal-to-noise ratio (SNR) determined by a radio link quality threshold greater than a threshold $Q_{in\_LR}$; or a hypothetical block error rate (BLER) of less than 10% based on a reference channel.

12. The method of claim 1, wherein the first set of criteria being met comprises a low mobility criterion specifying that the UE is in a state of low mobility, and wherein the second set of criteria being met comprises the low mobility criterion specifying that the UE is not in a state of low mobility.

13. The method of claim 12, wherein for the low mobility criterion, a radio-link monitoring-reference signal (RLM-RS) or a synchronization signal block (SSB) that is quasi co-located to an RLM-RS is used for calculation of reference signal received power (RSRP).

14. A method comprising:

transmitting, to a user equipment (UE), a configuration indicating at least part of a first set of criteria for relaxing an evaluation, such that the UE is configured to, responsive to determining, based on measurements in a measurement window, that the first set of criteria is met, enter a relaxation mode in which the evaluation is performed by the UE using a relaxed evaluation period, the relaxed evaluation period longer than a normal evaluation period with which the evaluation is not relaxed and the measurement window being longer than the normal evaluation period; and transmitting, to the UE, a configuration indicating at least part of a second set of criteria for not relaxing the evaluation, such that the UE is configured to, responsive to determining that the second set of criteria is met, exit the relaxation mode to perform the evaluation using the normal evaluation period.

15. The method of claim 14, wherein the first set of criteria comprises a set of entering relaxation criteria regarding serving cell quality and the second set of criteria comprises a set of exiting relaxation criteria regarding serving cell quality, and wherein the evaluation comprises at least one of radio link monitoring (RLM) or beam failure detection (BFD).

16. One or more non-transitory, computer-readable media having instructions that, when executed, cause processing circuitry to:

determine, based on measurements in a measurement window, that a first set of criteria is met for relaxing an evaluation;

in response to the determination that the first set of criteria is met, enter a relaxation mode in which the evaluation is performed by a user equipment (UE) using a relaxed evaluation period, the relaxed evaluation period longer than a normal evaluation period with which the evaluation is not relaxed;

determine that a second set of criteria is met for not relaxing the evaluation; and in response to the determination that the second set of criteria is met, exiting the relaxation mode to perform the evaluation using the normal evaluation period, wherein the measurement window is longer than the normal evaluation period.

17. The one or more non-transitory, computer-readable of claim 16, wherein the first set of criteria comprises a set of entering relaxation criteria regarding serving cell quality, and wherein the second set of criteria comprises a set of exiting relaxation criteria regarding serving cell quality.

18. The one or more non-transitory, computer-readable media of claim 17, wherein the evaluation comprises at least one of radio link monitoring (RLM) or beam failure detection (BFD).

19. The one or more non-transitory, computer-readable media of claim 17, wherein: the evaluation comprises radio link monitoring (RLM); the set of entering relaxation criteria regarding serving cell quality comprises an entering relaxation criterion for RLM; and the set of exiting relaxation criteria regarding serving cell quality comprises an exiting relaxation criterion for RLM.

20. The one or more non-transitory, computer-readable media of claim 17, wherein an entering relaxation criterion of the set of entering relaxation criteria regarding serving cell quality corresponds to a threshold signal-to-noise ratio (SNR) determined by a hypothetical block error rate (BLER) of less than 2% based on a reference channel.

\* \* \* \* \*